(12) United States Patent
Keyser

(10) Patent No.: US 6,811,175 B1
(45) Date of Patent: Nov. 2, 2004

(54) VEHICLE-TRAILER CONNECTING ARRANGEMENT

(76) Inventor: Norbert R. Keyser, 3250 Eiler Rd., De Pere, WI (US) 54115

( * ) Notice: Subject to any disclaimer, the term of this patent is extended or adjusted under 35 U.S.C. 154(b) by 0 days.

(21) Appl. No.: 10/716,234

(22) Filed: Nov. 18, 2003

(51) Int. Cl.$^7$ ................................................. B60D 1/00
(52) U.S. Cl. ....................................................... 280/477
(58) Field of Search ............................. 280/477, 478.1, 280/491.1, 504, 511

(56) References Cited

U.S. PATENT DOCUMENTS

| | | | |
|---|---|---|---|
| 2,799,416 A | * | 7/1957 | Balko et al. ................. 414/476 |
| 2,894,766 A | * | 7/1959 | Habriga ........................ 280/482 |
| 3,904,225 A | * | 9/1975 | George et al. ........... 280/478.1 |
| 4,042,254 A | * | 8/1977 | Allen ........................ 280/479.3 |
| 4,169,611 A | * | 10/1979 | Smith et al. ................. 280/482 |
| 4,773,667 A | * | 9/1988 | Elkins ...................... 280/479.3 |
| 5,009,445 A | * | 4/1991 | Williams, Jr. ............... 280/477 |
| 5,011,177 A | * | 4/1991 | Grice ......................... 280/482 |
| 5,277,446 A | * | 1/1994 | Hamel ........................ 280/477 |
| 5,277,447 A | | 1/1994 | Blaser |
| 5,913,507 A | * | 6/1999 | Lauricella, Jr. ............. 254/325 |
| 6,086,083 A | * | 7/2000 | Wilks ....................... 280/479.1 |
| 6,357,779 B1 | | 3/2002 | Mok et al. |

* cited by examiner

Primary Examiner—Lesley D. Morris
Assistant Examiner—Tony Winner
(74) Attorney, Agent, or Firm—Andrus, Sceales, Starke & Sawall, LLP

(57) ABSTRACT

A connection arrangement is provided for securing and aligning a female coupling on a trailer with a tow ball operably connected to a tow vehicle. An alignment assembly is removably attached to a frame of the trailer. A motion transfer assembly is connected by the alignment assembly to the trailer frame. The motion transfer assembly takes the form of a horizontal jacking mechanism including the rotatable crank for moving a transfer tube relative to a power crank device. A bar receiver assembly is connected by a tow ball to the tow vehicle. A pivot arm assembly is pivotally connected between the transfer tube of the motion transfer assembly and the tow vehicle. Rotation of the crank will move the female coupling on the trailer into alignment with the tow ball so that the female coupling can be locked upon the tow ball enabling the tow vehicle to tow the trailer.

10 Claims, 5 Drawing Sheets

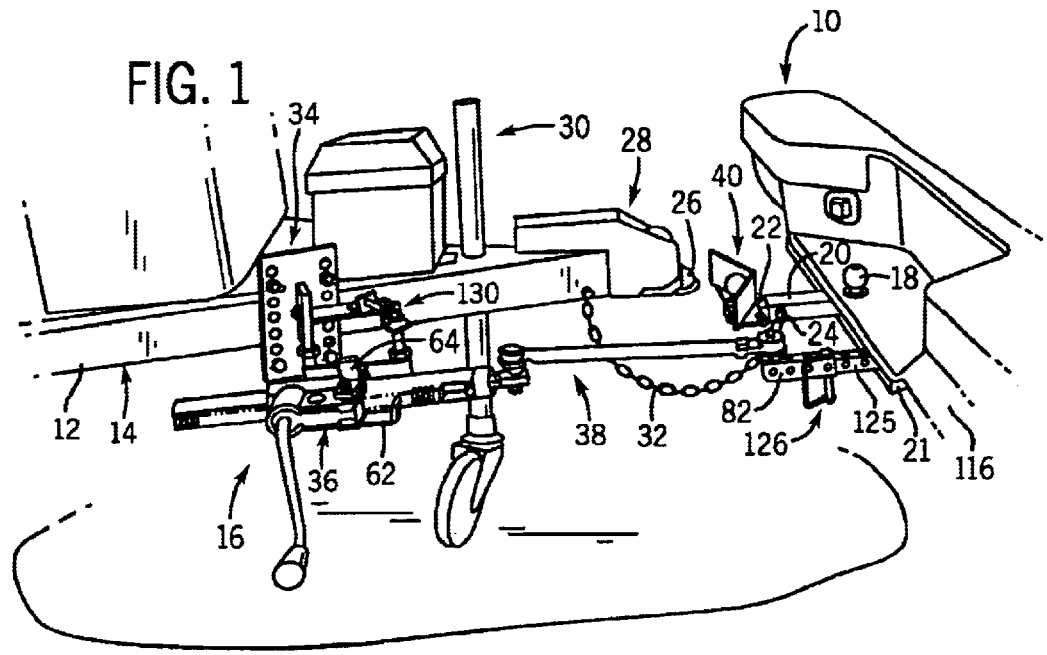

VEHICLE-TRAILER CONNECTING ARRANGEMENT

FIELD OF THE INVENTION

The present invention relates generally to a device for coupling a vehicle to a trailer and, more particularly, pertains to a connecting arrangement for bringing a parked vehicle and a parked trailer together to effect a hitching arrangement therebetween.

BACKGROUND OF THE INVENTION

Vehicle trailers such as utility trailers, boat trailers, camping trailers and the like are adapted for connection to a tow vehicle such as a truck, car or sport utility vehicle. The typical type of connection includes a tow ball secured to the vehicle and cooperable with a female coupling on the trailer. The female coupling normally carries a moveable member which permits the female coupling to fall upon and lock over the tow ball.

Normally, the entire trailer would be required to be moved so that the tow ball and female coupling can be aligned for engagement. With the exception of a jockey wheel for enabling vertical movement of the female coupling, there is no provision to enable the female coupling to be moved independently of the trailer. In order to make the tow ball-female coupling connection, the tow vehicle is moved towards the female coupling which requires the driver of the vehicle to carefully position the tow ball immediately adjacent the female coupling.

In order to overcome the alignment problems incurred while moving the trailer and towing vehicle, it is desirable to provide a connection arrangement which simplifies the joining between the trailer and the tow vehicle. It is also desirable to provide a connection arrangement which allows for a coupling between the tow vehicle and the trailer to be achieved as long as the tow ball and the female coupling are within a reasonable range bridged by the connection arrangement.

SUMMARY OF THE INVENTION

It is a general object of the present invention to provide a tow vehicle-trailer connection arrangement which can be used to easily couple a tow ball with a female coupling.

It is also an object of the present invention to provide a tow vehicle-trailer connection arrangement which is adaptable to various types of hitch assemblies.

It is a further object of the present invention to provide a tow vehicle-trailer connection arrangement capable of being set up and operated by a single individual.

It is an additional object of the present invention to provide a tow vehicle-trailer connection arrangement which does not require a precise alignment of the tow vehicle and trailer before connection is made.

It is another object of the present invention to provide a tow vehicle-trailer connection arrangement which employs a jacking mechanism to pull a trailer towards a tow vehicle.

Still another object of the present invention is to provide a tow vehicle-trailer connection arrangement which will prevent jackknifing of the trailer with respect to the tow vehicle.

In one aspect of the invention, a connection arrangement is provided for aligning and securing a female coupling on a trailer with a tow ball operably connected to a tow vehicle. An alignment assembly is removably attached to a frame of the trailer. A motion transfer assembly is connected by the alignment assembly to the trailer frame. The motion transfer assembly takes the form of a horizontal jacking mechanism including a rotatable crank for moving a transfer tube relative to a power crank device. A bar receiver assembly is connected by a tow ball to the vehicle. A pivot arm assembly is pivotally connected between the transfer tube of the motion transfer assembly and the tow vehicle. Rotation of the crank will move the female coupling on the trailer into alignment with the tow ball so that the female coupling can be locked upon the tow ball enabling the tow vehicle to tow the trailer.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a tow vehicle-trailer connection arrangement of the present invention as used on a utility trailer having a V-shaped frame portion;

FIG. 2 is a fragmentary rear view of a portion of the tow vehicle-trailer connection arrangement;

DETAILED DESCRIPTION

Figure 3:
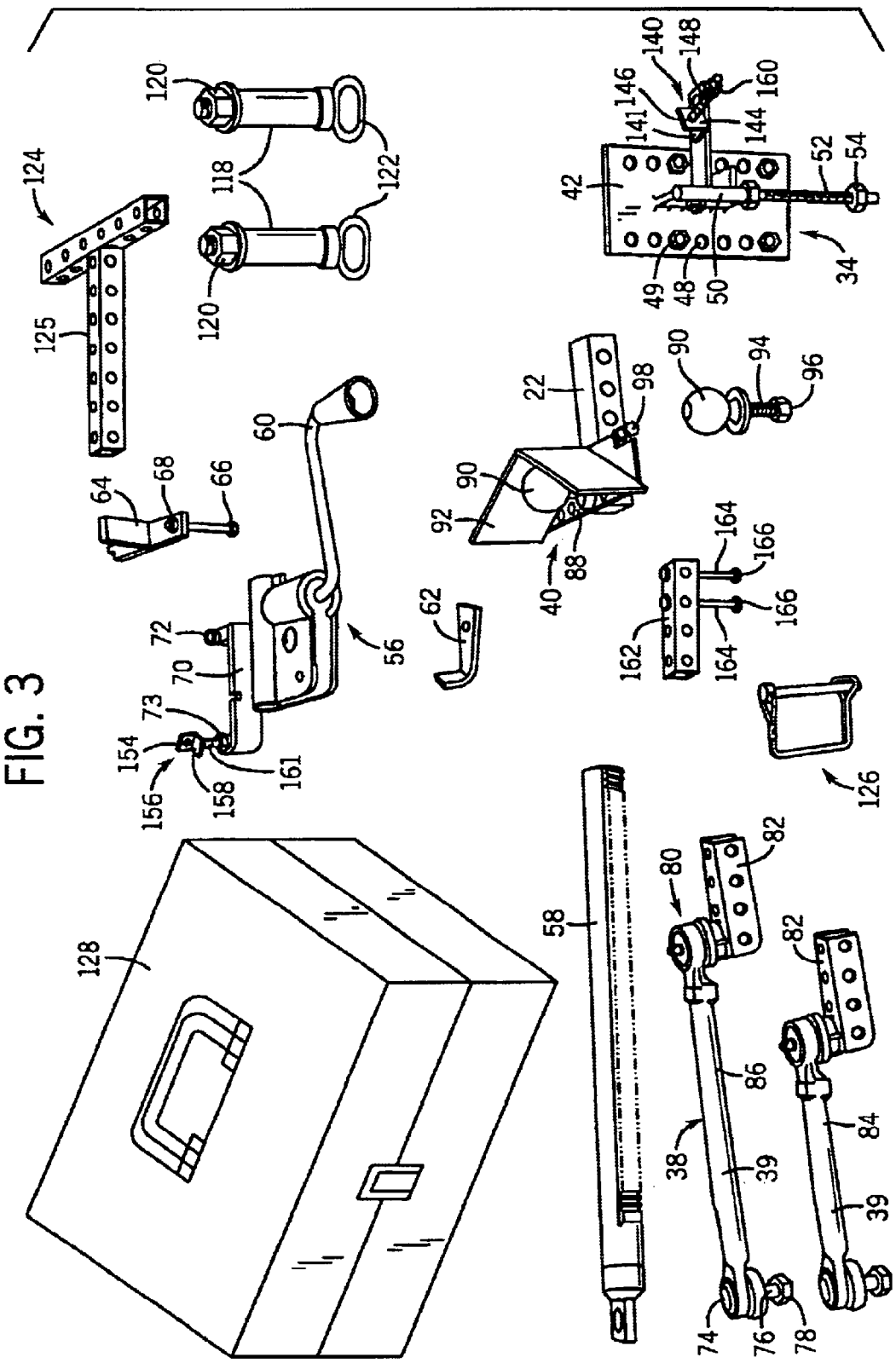
FIG. 3 is an exploded view of the components in a kit of the connection arrangement.

Referring now to the drawings, FIG. 1 illustrates a tow vehicle 10 coupled to a V-shaped frame portion 12 of a utility trailer frame 14 by a connection arrangement 16 constructed in accordance with the present invention.

As is known, the tow vehicle 10 includes a tow ball 18 connected directly to the back end thereof as well as a Class A tubular, receiver hitch 20 which receives a support bar 22 telescopically received and retained thereon by a pin 24. The trailer frame portion 12 has a free end provided with a female coupling 26 including a member 28 (FIG. 1) which is movable up and down for locking the female coupling 26 upon a tow ball once vertical and axial alignment have been achieved. The trailer frame portion 12 is also equipped with a vertically adjustable jack wheel stand 30 for selectively changing the height of the trailer frame 14. Conventional safety chains 32 are connected between the tow vehicle 10 and the trailer frame portion 12.

The connection arrangement 16 embodying the invention generally comprises an alignment assembly 34, a motion transfer assembly 36, a pivot arm assembly 38, and a bar receiver assembly 40.

Figure 4:
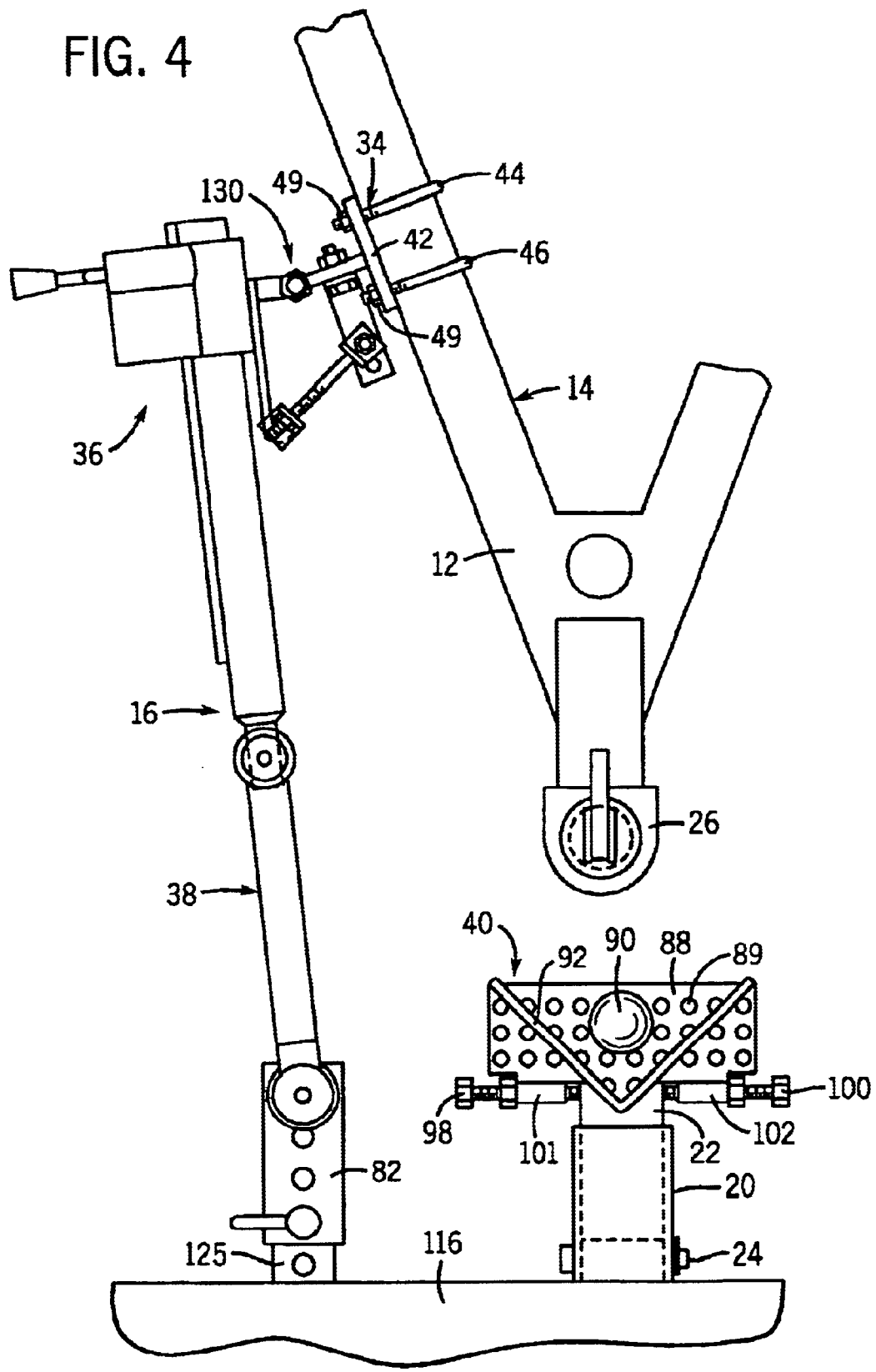
FIG. 4 is a plan view of a tow vehicle-trailer connection arrangement as used on the trailer, showing the female coupling of the trailer spaced apart from the tow ball.
Figure 5:
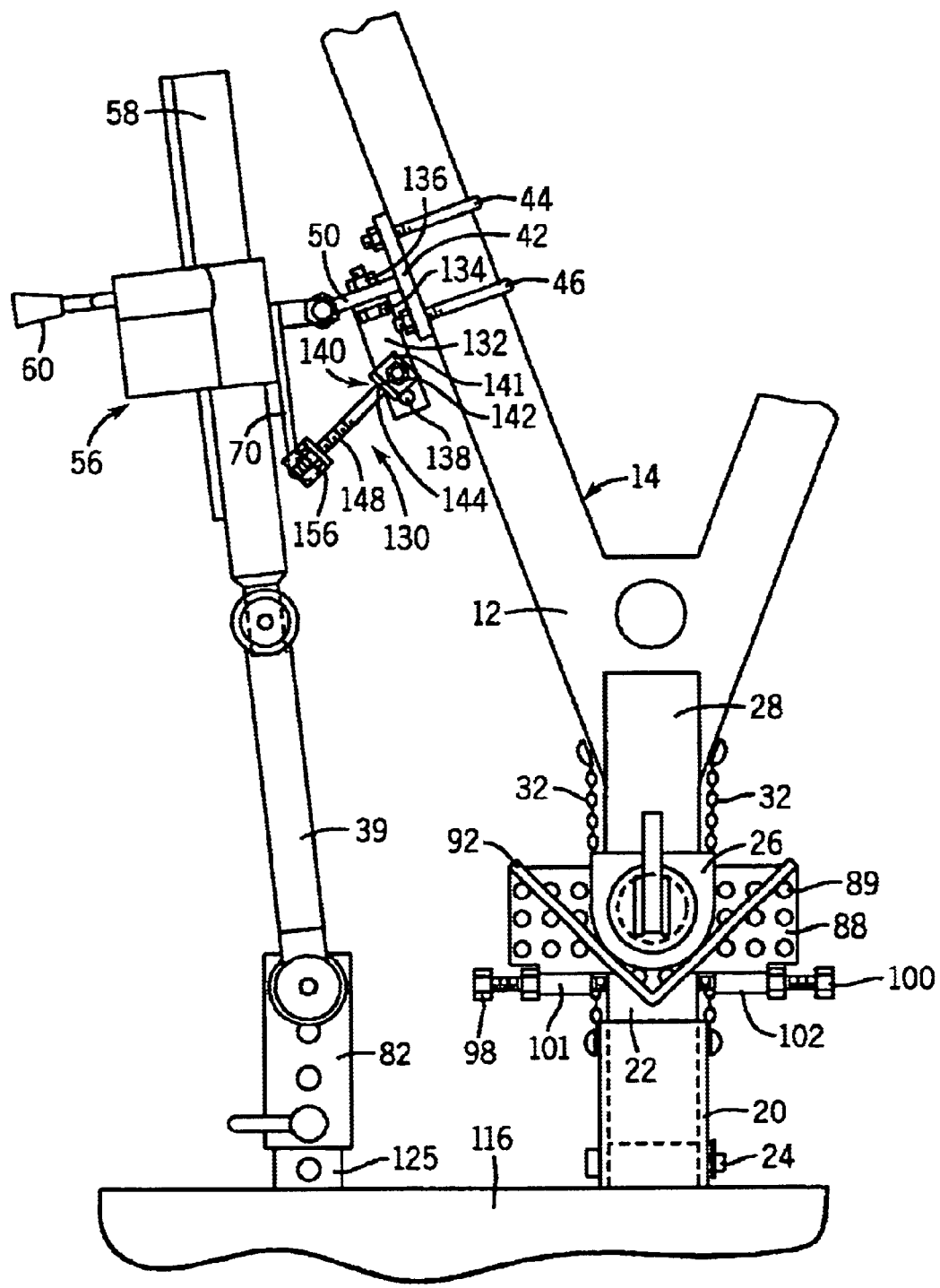
FIG. 5 is a view like FIG. 4 showing the female coupling connected to the tow ball.

As best seen in FIGS. 3, 4 and 5, the alignment assembly 34 includes a plate structure shown in the form of a single rectangular, parallel plate 42 which is held on one side of frame portion 12 by a set of U bolts 44, 46 passing through appropriate openings 48 above and below the frame portion 12 and retained by nuts 49. It should be understood that the plate structure may take other forms such as that of a pair of plates which are attached such as by a bolts to the trailer frame 12. The plate 42 has an extension 50 which is formed with a hole and which is welded at 90 degrees with respect to the plate 42. The outer end of the extension 50 is welded to an elongated threaded rod 52 having a nut 54 turned thereon.

The motion transfer assembly 36 takes the form of a vertical jacking mechanism oriented horizontally. More particularly, the motion transfer assembly 36 includes a crank power device 56 which receives a toothed transfer tube 58. A manual crank 60 is rotated to move the transfer tube 58 back and forth relative to the crank power device 56. Swingably attached to an underside of the crank power device 56 is a crank cradle 62. Pivotally secured to the top of the power crank device 56 is arm cradle 64. The crank cradle 62 and arm cradle 64 are pivoted about a pin 66 held in place by a nut 68 (FIG. 3). The crank power device 56 also includes a stabilizer plate 70 having at one end a first cylindrical tube 72 which rotatably receives the rod 52 of the alignment assembly 34. The plate 70 also has at its other end a second cylindrical tube 73 for receiving a portion of a restraining device 130 to be described below. This structure creates a mounting wherein the crank 60 may be easily rotated from outside the frame portion 12 to move the transfer tube 58 relative to the tow vehicle 10.

The pivot arm assembly 38 is defined by an elongated rigid arm 39 having a rearward end 74 which is pivotally connected to a rear end of the transfer tube 58 by a pin 76 and nut 78 (FIG. 3). The pivot arm assembly 38 also has a forward end 80 to which is rotatably attached a first square connecting tube 82 having a plurality of holes formed therethrough. As depicted in FIG. 3, the pivot arm assembly 38 is supplied in a seven inch length at 84, and in a 12 inch length at 86.

A T-type receiver 124 is connected to a framework 21 of the receiver hitch 20 beneath the rear end of the tow vehicle 10 as seen in FIG. 2. The receiver 124 has a straight tubular portion 125 having a plurality of apertures formed therethrough. The tubular portion 125 is telescopically connected with the connecting tube 82 on the pivot arm assembly 38. A U bolt 126 is passed through aligned holes in the tube 82 and apertures in the tubular portion 125 to openly connect the end of the pivot arm assembly 38 to the tow vehicle 10. It should be understood that the T-type receiver 124 can be laterally mounted at any position along the framework 21.

The bar receiver assembly 40 includes a straight bar 88 provided with multiple apertures 89 and at least one recess 91 for receiving a secondary tow ball 90. An upstanding V-shaped plate 92 is welded to the top of bar 88 and serves to prevent severe swinging of the trailer 14 so that jackknifing will not occur. The support bar 22 is formed with a hole 93 which is aligned with the recess 91 formed in bar 88. The secondary tow ball 90 has a threshold shaft 94 which is passed through the aligned hole 93 and recess 91, and has a nut 96 which is affixed to the bottom of shaft 94 to hold the tow ball 90 in place. A pair of retainer screws 98, 100 (FIGS. 4 and 5) are threadably received in respective rod couplings 101, 102 welded to the bar 88, and are used to engage sides of support bar 22 and prevent swinging movement of the V-shaped plate 92 and bar 88.

The restraining arrangement 130 is positioned between the extension 50 of the plate 42 and the stabilizing plate 70 on the crank power device 56 for preventing uncontrolled swinging of the transfer tube 58. The restraining arrangement 130 (FIGS. 3, 4, 5 and 6) includes a laterally extending bar 132 having one end provided with a threaded bolt 134 which passes through the hole in extension 50 and receives a nut 136 thereon. An opposite end of the bar 132 has a plurality of holes 138 formed therethrough. A first angle bracket 140 has a horizontal member 141 with an opening which is aligned with one of the holes 138, and a retainer 142 is used to couple the angle bracket 140 to the bar 132. The angle bracket 140 has a vertical member 144 with an aperture 146 formed therethrough. A threaded shaft 148 passes through aperture 146 and an aligned recess 152 formed in a vertical member 154 of a second angle bracket 156 having a horizontal member 158. A nut 160 is attached to the end of shaft 148 to set a spacing between the angle brackets 140, 156. A vertically depending threshold rod 160 is welded to the horizontal member 158. The rod 160 is received in the second cylindrical tube 73 on stabilizing plate 70. Various adjustments of the aforedescribed components of the restraining arrangement 130 can be made to position the angle of the transfer tube 58 relative to the trailer 14 as desired.

In use, it should be assumed that the adjustable stand 30 is in an operative position (such as shown in FIG. 1) for supporting the frame portion 12 of the trailer 14, and that the tow vehicle 10 has been moved in the general range of female coupling 26 on the trailer 14 as shown in FIG. 4. This can be facilitated by using a rear view mirror at the backside of the tow vehicle 10 and watching the relative position of the V-shaped plate 92 relative to the female coupling 26. Safety chains 32 are usually connected between the tow vehicle 10 and the trailer 14. A single individual may first install the bar 88 with its V-shaped plate 92, and the secondary tow ball 90 to the top of the support bar 22. Then the alignment assembly 34, the motion transfer assembly 36, the pivot arm assembly 38 and the restraining arrangement 130 are connected in place with the members 82, 125, respectively, coupled together. The crank 60 is then rotated to pull the trailer 14 towards the tow vehicle 10 until the female coupling 26 is located over the secondary tow ball 90. In the event, the trailer 14 is mired in mud, the holes in plate 88 are used to receive a pry bar (not shown) which can be utilized to assist the alignment of the female coupling 26 relative to tow ball 90. The moveable member 28 clamps the female coupling 26 upon the secondary tow ball 90 as shown in FIG. 5. The crank 60 is then placed in its crank cradle 62, and the vehicle 10 may be driven with the trailer 14 in proper tow.

It should thus be appreciated that the connection arrangement 16 allows for the proper vertical and axial alignment for the particular trailer geometry. The connection arrangement 16 enables the correct positioning of the trailer 14 relative to the tow vehicle 10 without manually moving the trailer 14 and coordinates the movement of the stand 30 and the tow vehicle 10. The various holes and apertures in the components accommodate different trailer tongue/slants and sizes and different frame designs.

Figure 6:
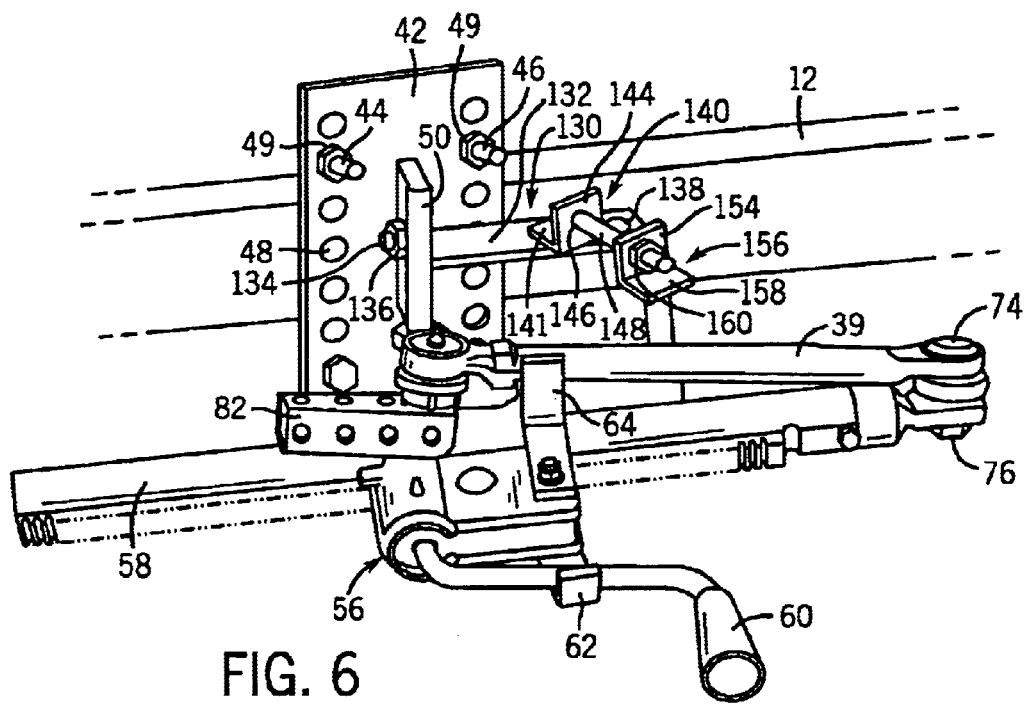
FIG. 6 is a perspective view of the alignment assembly, the motion transfer and the flexible arm assembly of the connection arrangement in a traveling condition.

Referring now to FIG. 6, when it is desirable to uncouple the tow vehicle 10 from the trailer 14, the stand 30 is lowered into supporting position with vehicle 10 and trailer 14 parked. The female coupling 26 is unlocked from the secondary tow ball 90, and the crank 60 is rotated to space the trailer 14 rearwardly from the tow vehicle 10. Then, the pivot arm assembly 38 with its connecting tube 82 is unpinned from the receiver 124. Next, the pivot arm assembly 38 and its connecting tube 82 are swung over the crank power device 56 with the arm cradle 64 holding the pivot arm assembly 38 in place. The crank 60 is placed in the crank cradle 62.

Figure 7:
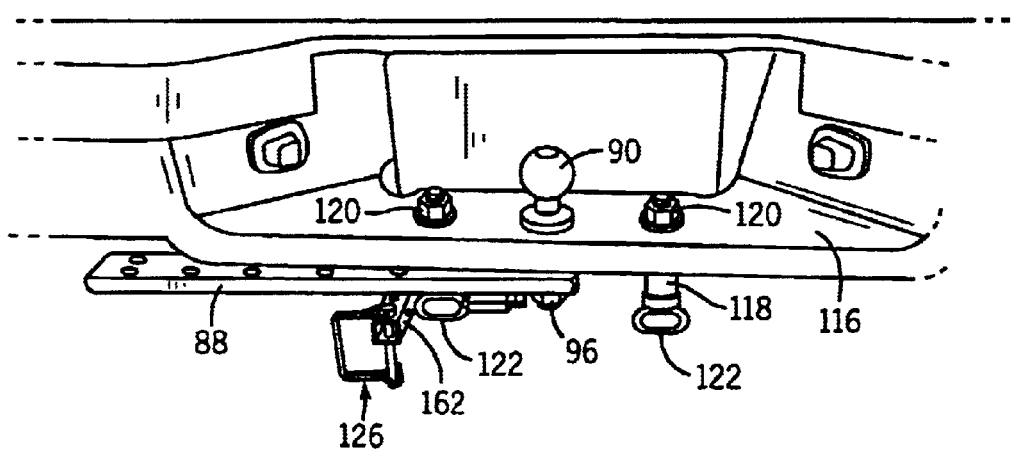
FIG. 7 is a rear view of a towing vehicle showing an alternative structure for the bar receiver of the connection arrangement.

Turning now to FIG. 7, the connection arrangement 16 may also be implemented for attachment to a tow vehicle bumper 116 when there is no receiver hitch. In this version, a receiver bar 88 is attached beneath the bumper 116 by means of the tow ball threaded shaft 94 and nut 96 as described above. A short extension 162 (FIG. 3) is attached by bolts 164 and nuts 166 to the bar 88 and provides an attachment for the connecting tube 82. On each side of the tow ball 18 is a safety chain provider 118 having a threaded rod which passes through the bumper 116 and is secured on top by a nut 120. The bottom of each provider carries a loop 122 to which the safety chain 32 from the trailer 14 is attached.

With further reference to FIG. 3, the connection arrangement 16 can be provided in kit form with all components fitting neatly in a container 128.

While the invention has been described with reference to a preferred embodiment, those skilled in the art will appreciate that certain substitutions, alterations and omissions can be made without departing from the spirit thereof. Accordingly, the foregoing description is meant to be exemplary only and should not be deemed limitative on the scope of the invention set forth with the following claims.

I claim:

1. A connection arrangement for aligning and securing a female coupling on a trailer with a tow ball operably connected to a tow vehicle comprising:

an alignment assembly removably attached to a frame of the trailer;

a motion transfer assembly connected by the alignment assembly to the trailer frame, the motion transfer assembly taking the form of a horizontal jacking mechanism including a rotatable crank for moving a transfer tube relative to a power crank device;

a bar receiver assembly connected by a tow ball to the tow vehicle; and a pivot arm assembly pivotally connected between the transfer tube of the motion transfer assembly and the tow vehicle, whereby rotation of the crank will move the female coupling on the trailer into alignment with the tow ball so that the female coupling can be locked upon the tow ball enabling the tow vehicle to tow the trailer.

2. The connection arrangement of claim 1, including a restraining arrangement connected between the alignment assembly and the motion transfer assembly for stabilizing the position of the motion transfer assembly.

3. The connection arrangement of claim 1, wherein the alignment assembly includes a plate structure connected to the tow vehicle.

4. The connection arrangement of claim 1, wherein the power crank device has a stabilizer plate having one end connected to the alignment assembly.

5. The connection arrangement of claim 4, wherein the stabilizer plate has a second end connected to the restraining arrangement.

6. The connection arrangement of claim 1, wherein the bar receiver assembly includes a straight bar having an upstanding V-shaped plate attached thereto, the straight bar being formed with a recess for receiving the tow ball which passes through a hole in a support bar extending from the tow vehicle.

7. The connection arrangement of claim 6, wherein the straight bar includes a pair of screw couplings for preventing swinging movement of the straight bar and V-shaped plate.

8. The connection arrangement of claim 1, wherein the pivot arm assembly has one end attached to a receiver secured to a rear end of the tow vehicle.

9. The connection arrangement of claim 2, wherein the restraining arrangement is adjustable to vary the position of the motion transfer assembly relative to the alignment assembly.

10. A method for aligning and securing a female coupling on a trailer with a tow ball connected to a tow vehicle, the method comprising the steps of:

removably attaching an alignment assembly to a frame of a trailer;

connecting a motion transfer assembly to the trailer frame by means of the alignment assembly, the motion transfer assembly being provided in the form of a horizontal jacking mechanism including a rotatable crank for moving a transfer tube relative to a power crank device;

connecting a bar receiver to the tow vehicle by means of the tow ball;

connecting a pivot arm assembly between the transfer tube of motion transfer assembly and the tow vehicle;

rotating the crank to move the female coupling on the trailer into alignment with the tow ball; and loading the female coupling onto the tow ball enabling the tow vehicle to tow the trailer.

* * * * *